US012124348B2

United States Patent
Parsons et al.

(10) Patent No.: US 12,124,348 B2
(45) Date of Patent: Oct. 22, 2024

(54) SYSTEM, APPARATUS AND METHODS FOR AUTOMATICALLY TESTING MOBILE DEVICES

(71) Applicant: Communications Test Design, Inc., West Chester, PA (US)

(72) Inventors: Gerald J. Parsons, Chester Springs, PA (US); Brian Parsons, Malvern, PA (US); Sean Parsons, West Chester, PA (US); Mark Parsons, West Chester, PA (US); Nidhin Davis, Avondale, PA (US); Timothy Hopfer, Honey Brook, PA (US); Pooya Heiraty, West Chester, PA (US); Soham Patwardham, Exton, PA (US); Lukasz Macnar, West Chester, PA (US); Mario Huber, West Chester, PA (US); Martin Fiedler, West Chester, PA (US); Bartosz Bedynski, West Chester, PA (US); Nick Gamber, Woolwich, NJ (US)

(73) Assignee: Communications Test Design, Inc., West Chester, PA (US)

( * ) Notice: Subject to any disclaimer, the term of this patent is extended or adjusted under 35 U.S.C. 154(b) by 980 days.

(21) Appl. No.: 16/923,465

(22) Filed: Jul. 8, 2020

(65) Prior Publication Data

US 2021/0011824 A1 Jan. 14, 2021

Related U.S. Application Data

(60) Provisional application No. 62/871,455, filed on Jul. 8, 2019.

(51) Int. Cl.
*G05B 23/02* (2006.01)
*B25J 9/16* (2006.01)
(Continued)

(52) U.S. Cl.
CPC .......... *G06F 11/273* (2013.01); *B25J 9/1679* (2013.01); *B25J 15/0019* (2013.01);
(Continued)

(58) Field of Classification Search
CPC ...... B25J 11/00; B25J 15/0019; B25J 19/023; B25J 9/1679; G06F 11/2221;
(Continued)

(56) References Cited

U.S. PATENT DOCUMENTS 3,552,297 A * 1/1971 Williams ................ F25D 17/06
62/157
2008/0262759 A1* 10/2008 Bosl ................ G01R 31/31908
702/58
(Continued)

*Primary Examiner* — Yuhui R Pan
(74) *Attorney, Agent, or Firm* — Duane Morris LLP

(57) ABSTRACT

Apparatus and methods for automatically testing mobile devices are disclosed according to various embodiments. In one example, a disclosed apparatus includes: a robot having a retention device into which the mobile device to be tested is positioned; a test computer having a processor and a non-transitory computer readable storage medium storing test software for testing the mobile device; and a user monitor electrically connected to the test computer and configured for providing a result of the testing of the mobile device. The mobile device is wirelessly connected to the test computer and has a test application installed thereon corresponding to the test software. The robot is configured for performing interaction and manipulation of the mobile device in cooperation with the test application and the test software during the testing.

21 Claims, 6 Drawing Sheets

(51) Int. Cl.
*B25J 15/00* (2006.01)
*B25J 19/02* (2006.01)
*G06F 11/273* (2006.01)
*G06K 19/06* (2006.01)
*G06T 1/00* (2006.01)
*H04W 24/06* (2009.01)

(52) U.S. Cl.
CPC ............ *B25J 19/023* (2013.01); *G05B 23/02* (2013.01); *G06K 19/06028* (2013.01); *G06T 1/0014* (2013.01); *H04W 24/06* (2013.01); *G05B 2219/32204* (2013.01); *G06T 2200/24* (2013.01)

(58) Field of Classification Search
CPC ............ G06F 11/273; G06K 19/06028; G06T 1/0014; G06T 2200/24; H04W 24/06; G05B 23/02; G05B 2219/32204
See application file for complete search history.

(56) References Cited

U.S. PATENT DOCUMENTS

| | | | |
|---|---|---|---|
| 2014/0187172 A1* | 7/2014 | Partee | H04H 20/12 455/67.12 |
| 2016/0187876 A1* | 6/2016 | Diperna | G06F 3/0346 702/81 |
| 2017/0279945 A1* | 9/2017 | Parsons | A47B 87/00 |
| 2018/0054265 A1* | 2/2018 | Lee | G01R 29/0821 |

* cited by examiner

SYSTEM, APPARATUS AND METHODS FOR AUTOMATICALLY TESTING MOBILE DEVICES

CROSS-REFERENCE TO RELATED APPLICATION

This application claims priority to U.S. Provisional Application No. 62/871,455 filed on Jul. 8, 2019, the entirety of which is hereby incorporated by reference herein.

FIELD

The present disclosure generally relates to system, apparatus and methods for testing mobile devices, and more specifically, to system, apparatus and methods for automatically testing mobile devices without human intervention.

BACKGROUND

Mobile devices, including tablets and phones, have become sophisticated, widespread and pervasive. With the increasing usage of computer network services all over the world, these mobile devices are in great demand. As a result, the cost of used mobile devices has increased. However, as with any used device, the used mobile device needs to be tested to determine operability. As the sizes of mobile devices decrease, and the number of working parts increases, testing of the used mobile device is not only complicated, but also time consuming and expensive.

SUMMARY

The present disclosure generally relates to systems and methods for testing mobile devices. More specifically, some embodiments of the present disclosure are directed to apparatus and methods for automatically testing one or more mobile devices (multiple devices can be tested simultaneously either together or independently), e.g., using robotics.

The exemplary embodiments disclosed herein are directed to solving the issues relating to one or more of the problems presented in the prior art, as well as providing additional features that will become readily apparent by reference to the following detailed description when taken in conjunction with the accompanying drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, an apparatus is disclosed for automatically testing a mobile device. The apparatus includes: a robot having a retention device into which the mobile device to be tested is positioned; a test computer having a processor and a non-transitory computer readable storage medium storing test software for testing the mobile device; and a user monitor electrically connected to the test computer and configured for providing a result of the testing of the mobile device. The mobile device is wirelessly connected to the test computer and has a test application installed thereon corresponding to the test software. The robot is configured for performing interaction and manipulation of the mobile device in cooperation with the test application and the test software during the testing.

In another embodiment, a method is disclosed for automatically testing a mobile device. The method includes: loading a test application on the mobile device positioned onto a retention device of a robot; automatically wirelessly connecting the mobile device to a test computer having a processor and a non-transitory computer readable storage medium storing test software for testing the mobile device; automatically manipulating the mobile device using the robot configured for interacting with the mobile device in cooperation with the test application and the test software; automatically testing the mobile device based on the test application; and automatically sending a result of the testing of the mobile device to a user monitor electrically connected to the test computer and configured for displaying the result of the testing of the mobile device.

In yet another embodiment, a system is disclosed for automatically testing mobile devices. The system includes: a plurality of robots each of which having a retention device configured for holding one of a plurality of mobile devices to be tested; a plurality of device test chambers each housing a respective one of the plurality of robots; and a plurality of test computers each of which corresponds to one of the plurality of robots, and has a processor and a non-transitory computer readable storage medium storing test software for testing a corresponding one of the plurality of mobile devices. The corresponding mobile device is wirelessly connected to the test computer and has a test application installed thereon corresponding to the test software. Each of the plurality of robots is configured for performing interaction and manipulation of the corresponding mobile device held by the retention device in cooperation with the test application and the test software during the testing.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION

Figure 1:
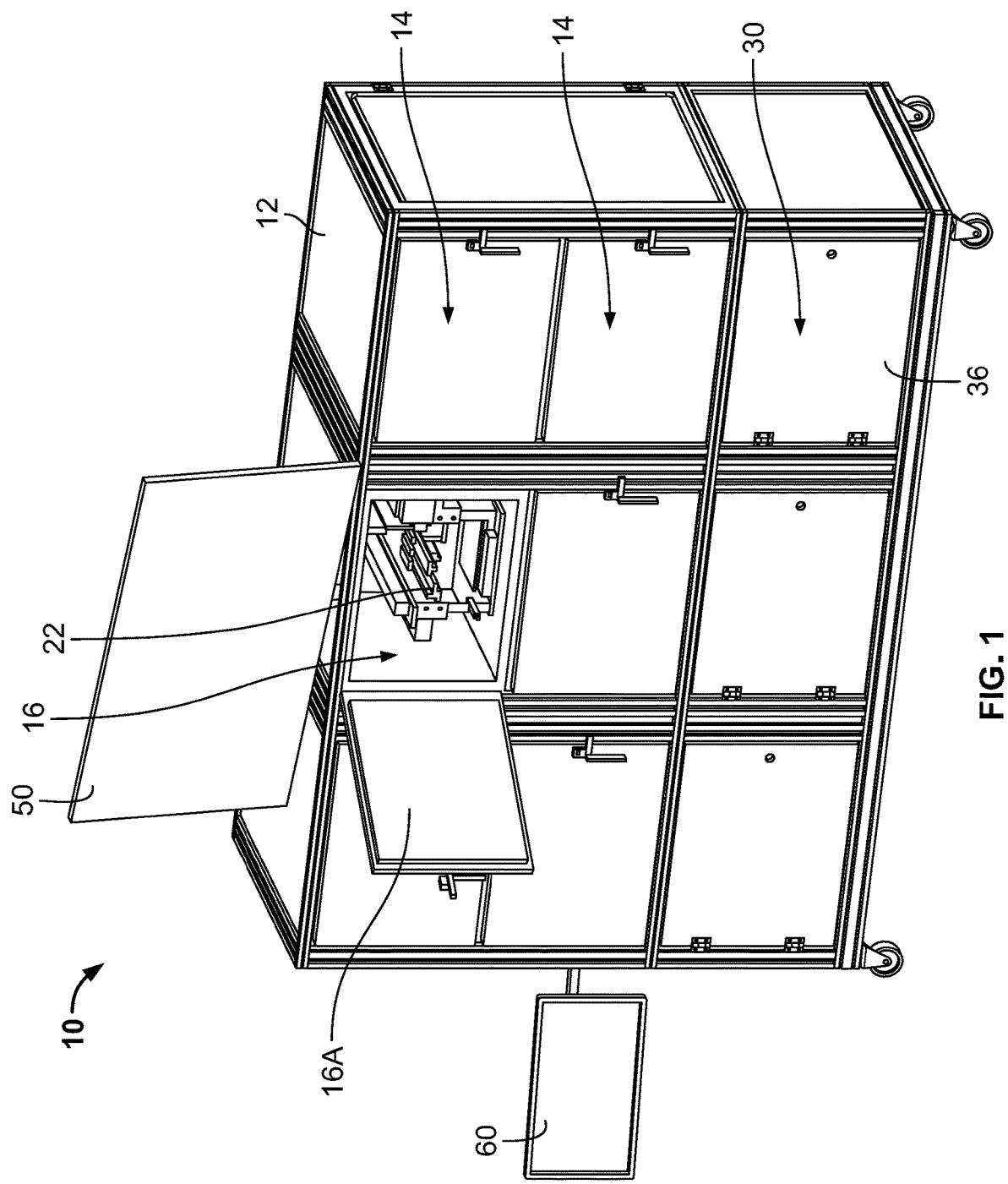
FIG. 1 is a perspective view of a mobile device testing apparatus, in accordance with some embodiments of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "vertically," "downwardly," "upwardly," etc.) should be construed to refer to the orientation as then described or as shown in the drawing under discussion. These relative terms are for convenience of description and do not require that the apparatus be constructed or operated in a particular orientation.

Various embodiments of the present disclosure provide methods and systems for automatically testing mobile devices. In one embodiment, a testing system is provided for performing a completely automated functional testing of mobile devices, e.g. tablets, smartphones, smart watches. The disclosed system comprises a robot which can assist in the testing functionality through interaction and manipulation of the mobile device under test and work in collaboration with a testing app. The testing app may be customized during development. The disclosed system can support a complete functional testing of smartphones, tablets, and smart watch, across both iOS and Android operating systems. This may be achieved based on a software suite and a smartphone app that drives the test functionality.

In one embodiment, a disclosed testing system comprises: at least one test computer, a master computer, a robot, and a control system. The test computer drives all the test software and controls the app activity. The master computer communicates with each of the at least one test computer and provides graphic user interface (GUI) for interaction with users. The robot may be a multi-axis robotic system that provides a motion controlled platform with toolbox and/or universal fixture to hold various sizes of mobile devices. The robot may also comprise a robot arm with object manipulation capabilities in addition to other features related to mobile device testing. The control system can comprise a control computer or programmable logic controller, and a compact and modular input/output (I/O) system to drive the robot and onboard I/O modules.

An illustrative embodiment of a mobile device testing apparatus 10 is shown in FIG. 1. The methods in the present disclosure can be applied for not only testing mobile devices, but also other electronic devices. The mobile device testing apparatus 10, as shown in FIG. 1, comprises a frame 12, a plurality of device test chambers 16, a plurality of test equipment cabinets 30, a sanity monitor 50, and a user monitor 60 connecting to the master computer. Each of the plurality of device test chambers 16 has a front door 16A and a robot 22 inside the front door 16A for receiving a mobile device for testing.

The frame 12, as shown in FIG. 1, is a structure forming a plurality of slots 14. The plurality of device test chambers 16 are each positioned in one of the plurality of slots 14 of the frame 12. The plurality of device test chambers 16 may be substantially square members, or any shape necessary to fit the slots 14.

The frame 12 has six slots in the exemplary embodiment shown in FIG. 1. That is, there are six device test chambers 16 in the mobile device testing apparatus 10 in the exemplary embodiment shown in FIG. 1. The number of slots 14, the number of device test chambers 16, and correspondingly the number of mobile devices that can be simultaneously tested, may vary based on the application. The frame 12 may be constructed out of any material that provides sufficient rigidity for the mobile device testing apparatus 10, including metals, plastics, and other materials known to those with ordinary skill in the art.

In one embodiment, each of the plurality of slots 14 is a radio frequency (RF) shielded cabinet containing a respective device test chamber 16. The front door 16A of each of the plurality of device test chambers 16 is moveably or slidably mounted to the frame 12. After the front door 16A is opened, a mobile device to be tested may be placed into the corresponding device test chamber 16 and onto a robot 22 in the device test chambers 16.

Since each slot is a RF shielded cabinet, after the front door 16A is closed, a wireless signal cannot be transmitted directly through the walls of the RF shielded cabinet. In one embodiment, each RF shielded cabinet has at least one antenna mounted to and through a wall of the cabinet. For example, each RF shielded cabinet 14 has four antennas coupled to and through a back wall of the RF shielded cabinet 14. At least one antenna can receive wireless signals from the mobile device and forward the wireless signals to a wireless router, e.g. a Wi-Fi router. Similarly, at least one antenna can receive wireless signals from the wireless router and forward the wireless signals to the mobile device. In one embodiment, each antenna is connected to the Wi-Fi router via a cable.

In one embodiment, the Wi-Fi router is electrically connected to test computers by wire. That is, each mobile device being tested can communicate with a corresponding test computer, via a Wi-Fi router, without being interfered by other wireless signals. The antenna coupled to and through a wall of each RF shielded cabinet 14 helps to connect the wireless router with the corresponding mobile device to be tested in the RF shielded cabinet 14.

In one embodiment, the front door 16A has a magnetic lock thereon for locking the front door 16A magnetically. In one embodiment, once after the testing of the mobile device in the RF shielded cabinet 14 or the corresponding device test chambers 16 is completed, the magnetic lock on the front door 16A is automatically released. Through this disclosure, an automatic action means it is done without human intervention.

In one embodiment, the test computers are positioned in the test equipment cabinets 30. In one example shown in FIG. 1, there are six RF shielded cabinets or slots 14 positioned in three columns, two RF shielded cabinets stacked in each column. Each RF shielded cabinet corresponds to a test computer positioned in a test equipment cabinet 30 below the RF shielded cabinet. That is, in the example shown in FIG. 1, each test equipment cabinet 30 contains two test computers corresponding to the two RF shielded cabinets 14 stacked over the test equipment cabinet 30, respectively.

In one embodiment, a test application is pre-installed on a mobile device to be tested. Before testing, the test application is loaded, once for the entire test, on the mobile device. The mobile device may be connected to a Wi-Fi network after being positioned in the RF shielded cabinet 14, e.g. via antennas mounted on a wall of the RF shielded cabinet 14. The robot 22 in the RF shielded cabinet 14 may also connect to the same Wi-Fi network when testing the mobile device.

Each test computer is also connected to the same Wi-Fi network. In one embodiment, each test computer has a processor and a non-transitory computer readable storage medium storing test software for testing a mobile device positioned in a RF shielded cabinet 14 corresponding to the test computer. The mobile device is wirelessly connected to the test computer, e.g. via the wireless router, and has a test application installed thereon corresponding to the test software. The robot 22 may be configured for performing interaction and manipulation of the mobile device in cooperation with the test application and the test software during the testing.

In one embodiment, the system includes a scanner (not shown in FIG. 1) electrically connected to the plurality of test computers and configured for scanning slot numbers corresponding to RF shielded cabinets 14 or device test chambers 16, and scanning serial numbers of mobile devices. For example, before testing a mobile device, the scanner may first scan a slot number of the device test chamber or RF shielded cabinet in which the mobile device will be tested. Then, the user monitor 60 may show an instruction or indication to scan a serial number, e.g. an international mobile equipment identity (IMEI), of the corresponding mobile device to be tested in the device test chamber, which has the scanned slot number. Following the instruction or indication, the scanner may scan a serial number of the corresponding mobile device to be tested, before it is positioned in the device test chamber for testing. After the scanning of the slot number and the serial number, the scanned serial number is associated with the scanned slot number, such that the system knows that which mobile device is tested in which slot or cabinet. Then an operator can open the front door 16A, and place the mobile device into the corresponding slot, e.g. slot N. In one embodiment, a selection, by the operator or by a signal from the test computer, is made on the test application of the mobile device to indicate that the testing of the mobile device is performed in the corresponding slot N, which automatically starts the test in slot N. The front door 16A may be closed by the magnetic lock on the front door 16A during the test.

The same scanner may then be used to scan a slot number of another slot and a serial number of another mobile device to be tested in that slot, while the test is performed in slot N. The sanity monitor 50 may be a single monitor that can show internal views of all of the device test chambers 16 of the system, when the doors 16A are closed and the tests are being performed. For example, in the example shown in FIG. 1, where there are six device test chambers 16, the sanity monitor 50 may show what is going on in each of the six chambers in six split screen views in the single monitor 50. In one embodiment, the six split screen views have a same size. In another embodiment, after one chamber or cabinet is selected, the selected chamber is shown in a large screen view, and the other five chambers are shown in five small screen views respectively.

Figure 2:
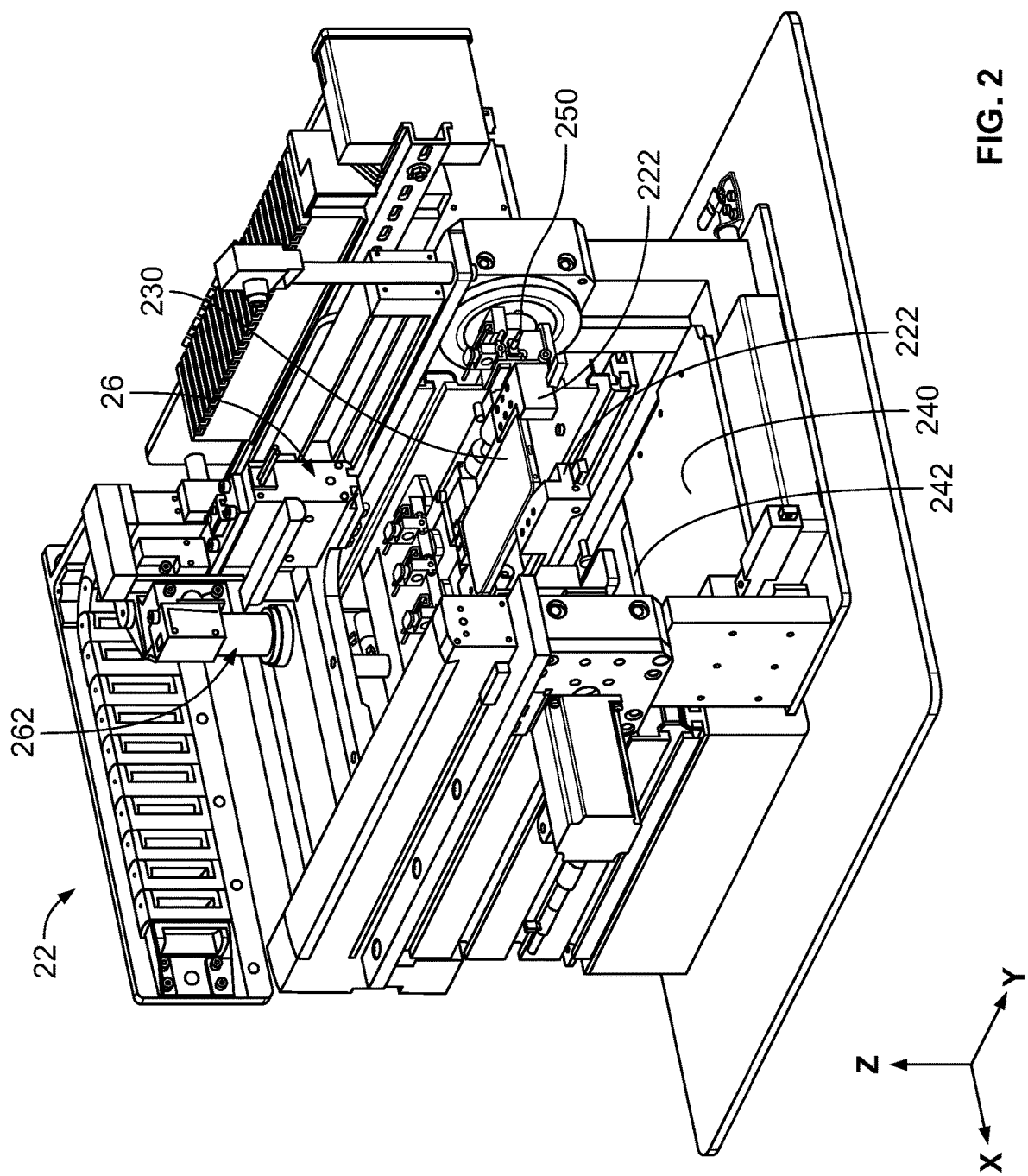
FIG. 2 is a perspective view of a robot that is used to test of a mobile device in the testing apparatus, in accordance with some embodiments of the present disclosure.

As shown in FIG. 2, a robot 22 includes a retention device 222 into which the mobile device 230 to be tested is positioned. In one embodiment, the retention device 222 has two arms that can clasp the mobile device 230 therebetween. The retention device 222 holding the mobile device 230 can rotate the mobile device about the Y axis with any degree between 0-360 degrees; and can rotate the mobile device about the X axis with a degree between 0-50 degrees.

As discussed before, after scanning a slot number of the cabinet housing the robot 22 and scanning a serial number of the mobile device 230, the system associates the scanned serial number with the scanned slot number. Based on the serial number of the mobile device 230, the system can automatically determine, e.g. from a database stored in the main computer or in a cloud server, testing-related information of the mobile device 230. In various embodiments, the testing-related information comprises information about at least one of: an operation system of the mobile device, number and locations of interfaces of the mobile device, dimensions and locations of the screen of the mobile device, number and locations of cameras of the mobile device on each side, number and locations of physical buttons of the mobile device, and/or hardware, firmware and software features of the mobile device.

In the example shown in FIG. 2, the robot 22 further includes a motional robot arm 26. The robot arm 26 can move vertically along the Z direction, and horizontally along the X direction and the Y direction. The robot arm 26 can hold tools for testing the mobile device. In general, the robot 22 automatically performs interaction and manipulation of the mobile device 230, in cooperation with the test application running on the mobile device 230 and/or the test software running on the corresponding test computer, while at least one test process is performed to test internal components and/or feature performances of the mobile device 230. Once the test application starts running, e.g. after a corresponding slot number is selected on the test application, the entire testing of the mobile device 230 on the robot 22 will be performed automatically.

In one embodiment, during the testing of the mobile device 230, the robot 22 can use a capacitive touch tip tool coupled to the robot arm 26 to make touchpoints on a touchscreen of the mobile device 230, based on the test application. As such, the touchscreen of the mobile device 230 is automatically tested based on the test application, using a capacitive touch tip tool, e.g. a customized stylus pen.

In one embodiment, during the testing of the mobile device 230, the robot 22 can use the capacitive touch tip tool coupled to the robot arm 26 to automatically test a proximity sensor of the mobile device 230, based on the test application. For example, after the test application activates a proximity sensor of the mobile device 230, the robot 22 can use a customized stylus pen to go over and touch the screen of the mobile device 230. Then the test application may notify the test computer and the system, via the Wi-Fi network, about a detection of the proximity sensor triggered by the actions of the robot 22, which means the proximity sensor works well.

In one embodiment, during the testing of the mobile device 230, a back camera of the mobile device 230 is automatically tested based on the test application, using predetermined images, e.g. a colorful patterned image and a white blank image. For example, while the back camera of the mobile device 230 is facing a white board 240 under the mobile device 230, the test software on the system or on the test computer may send a command to the test application to turn on the back camera to perform the back camera test. During the back camera test, the back camera takes pictures of some predetermined images, based on the test application. For example, the back camera may take a picture of the white board 240, and take a picture of a plate 242 having a colorful predetermined image after the robot 22 moves the plate 242 along the Y direction to cover the white board 240. The test application may then pass the taken pictures to the test computer and/or the main computer over Wi-Fi, so that the test computer and/or the main computer may use some algorithm to analyze the taken pictures. Based on the analysis, the performance of the back camera is tested. For example, the white blank picture taken from the white board 240 under the mobile device 230 can be used to check whether there is a black spot or fingerprint on the back camera. In another example, a picture taken from a colorful image associated with codes and patterns may be used to test whether the back camera can focus correctly onto the image, e.g. based on brightness or sharpness of the picture.

In one embodiment, during the testing of the mobile device 230, a front camera of the mobile device 230 is automatically tested based on the test application, using the predetermined images, in a similar manner to the testing of the back camera. For example, after the robot 22 turns over or flips over the mobile device 230 by rotating the retention device 222 by 180 degrees, the front camera of the mobile device 230 is facing the white board 240 under the mobile device 230, if the back camera was facing the white board 240 before the flip. Then, the test software and the test application may control the front camera to take pictures and send the taken pictures of the predetermined images to the test computer and/or the main computer for image analysis. In one embodiment, the image analysis for the front and back cameras may be performed while other tests of the mobile device 230 are performed in the cabinet.

In one embodiment, during the testing of the mobile device 230, the robot 22 grabs an audio connecter 250 electrically connected to the robot 22 and plugs it into an audio port of the mobile device 230, to test the audio output of the mobile device 230. Based on the test application, a speaker of the mobile device 230 may be automatically tested via the audio connector. In one embodiment, the system performs an IMEI match at the beginning of the testing to determine whether the correct IMEI is scanned. If not, the system may show an error to the user via the user monitor 60. A correct IMEI match is helpful to determine a correct audio connector that matches the audio port of the mobile device 230. In one embodiment, a microphone coupled to the robot 22, e.g. coupled to the robot arm 26, may be used to test the functionality of a speaker of the mobile device 230, while a sound is generated by the test application on the mobile device 230.

In one embodiment, during the testing of the mobile device 230, a speaker coupled to the robot 22, e.g. coupled to the robot arm 26, may automatically generate a sound based on the test software and test application, to automatically test a microphone of the mobile device 230 using the sound. Based on the generated sound at the speaker built in the robot 22 and the received sound by the microphone of the mobile device 230, the test application can determine the functionality and performance of the microphone of the mobile device 230.

In one embodiment, during the testing of the mobile device 230, the robot 22 may use a mechanical finger coupled to the robot arm 26 to automatically push each physical button on the mobile device 230 for functionality test, based on the test application. The number and locations of the physical buttons on the mobile device 230 may be determined by the system based on the scanned serial number of the mobile device 230.

In one embodiment, during the testing of the mobile device 230, the robot 22 may use a camera 262 coupled to the robot arm 26 to automatically take pictures of a screen of the mobile device 230 when the screen is turned to different colors based on the test application, e.g. when the test application turns the screen to green, blue, red, respectively. The test software on the test computer may help to determine when the camera 262 should be moved to a correct position to take these pictures. The pictures are sent to the corresponding test computer for analysis. In one embodiment, the test computer automatically analyzes the pictures in the background while other tests are being performed on the mobile device 230.

In one embodiment, during the testing of the mobile device 230, the robot 22 may use a magnetic tool coupled to the robot arm 26 to check a magnetic field sensor of the mobile device 230, based on the test application. A magnetic field sensor measures the magnetic fields along the three axes of the mobile device 230. It may be used to identify the direction. For example, the magnetic tool may be moved around with the mobile device 230 to automatically test the magnetic field sensor.

In one embodiment, during the testing of the mobile device 230, the system may automatically test a near field communication (NFC) functionality of the mobile device 230, based on the test application. The NFC functionality may be tested with other tests being performed in the background.

In one embodiment, during the testing of the mobile device 230, the system includes another camera located in the device test chamber, e.g. coupled to a fixed part of the robot 22, to automatically monitor a process of the automatically testing in the device test chamber. The camera may be connected to a sanity monitor 50 (as shown in FIG. 1) outside the device test chamber for awareness and sanity control.

In one embodiment, the system further includes a position calibration tool coupled to the robot 26 and configured for determining positions of interfaces and physical buttons of the mobile device 230, e.g. by testing the positions of multiple points (e.g. three points) on the retention device that holds the mobile device 230 and a calibration software. After the automatic testing is completed, the system can automatically release a magnetic lock on a door of the device test chamber.

During the automatic testing, for each successful test, the test application sends a pass signal to the test computer, which forwards the pass signal to the main computer, which may display a green check or another indication on the user monitor 60. The user monitor 60 is electrically connected to the test computer and configured for providing and displaying one or more results of the testing of the mobile device 230. After the automatic testing is completed, the test computer may automatically send a result of the testing of the mobile device 230 to the user monitor 60 for display. Failure codes related to the automatic testing will be sent to a database to be stored thereon. The test result can be printed out with a serial number (e.g. IMEI), a bar code associated with the test, and/or a label corresponding to the failure codes.

According to various embodiments, the robot 22 may contain a microphone, a speaker, one or more cameras, and/or LED. The robot 22 may also have a test image underneath with a light. The image can be moved front and back, e.g. along the Y axis. A mobile device to be tested may be placed and fixed onto the retention device 222. The robot 22 has a robot arm that can move along various axes. In one embodiment, the retention device 222 can be rotated 360 degrees around the Y axis, and about 50 degrees around the X axis. That is, the robot 22 has the ability to move the mobile device 360 degrees in rotational plane and about 50 degrees in vertical plane, to monitor multiple internal sensors of the mobile device in one process. The rotation of the mobile device allows both cameras of the mobile device to be tested with a same set of markers and backlight, and allows for testing sensors at the backside of the mobile device. For example, a near field communication (NFC) may be tested along with other tests in the background.

In one embodiment, the robot 22 is a 7-axis robotic system that interacts with the mobile device throughout the test cycle. The robot arm of the robot 22 may have 4 degrees of freedom with object manipulation capabilities in the three-dimensional (3D) space. An end effector of the robot arm has precise position control to grab tools with desired grip strength. A gripper of the robot arm may comprise two capacitive mesh-tips.

In one embodiment, the robot 22 has the ability to pick and place different tools for testing functionality. For example, a tool with capacitive stylus tip will enable the robot to interact (touch, swipe, multi-touch etc.) with a screen of the mobile device at locations that may be user defined, accurate and easy to calibrate.

In one embodiment, the robot 22 has a camera 262 mounted on its arm which moves to defined locations to capture images of the mobile device under test. This allows for enhancement and automation of tests like smartphone display test, flash test, where the robot takes pictures in each scenario for analysis by software based on user defined thresholds and/or parameters.

In one embodiment, the robot 22 allows all tests to be fully automated without operator intervention at any point. While tests like camera testing, audio testing, display testing were previously performed manually by operator interacting with the mobile device and were susceptible to subjectivity, these tests are performed through robot with parametric results according to various embodiments of the present disclosure.

In one embodiment, the robot 22 has a motion controlled platform, which is a test platform that holds the fixture, such that the mobile device is motion controlled in 2 degrees of freedom. The robot 22 can tilt the phone as well as rotate it 360° with precise position control in each direction.

In one embodiment, the platform of the robot 22 also includes a toolbox which has various tools with functionalities such as capacitive stylus head, magnet, near field communication (NFC) tag and lightening/type-c connector, 3.5 mm audio jack, etc. In various embodiments, the retention device 222 can support different sizes and models of mobile devices without any tools required for adjustment.

In one embodiment, the robot 22 has a camera 262 mounted to the robot arm. The camera may be directly controlled through software application programming interface (API). This camera 262 may be used to capture images of the mobile device for tests such as pixel testing. The robot base is fitted with a backlight that shines the light to illuminate the markers.

The retention device 222 may be made of nylon, polyurethane, or other plastics. One with ordinary skill in the art would understand that other materials could be used that do not scratch or damage a mobile device when the mobile device contacts the elements during insertion and removal.

Figure 3:
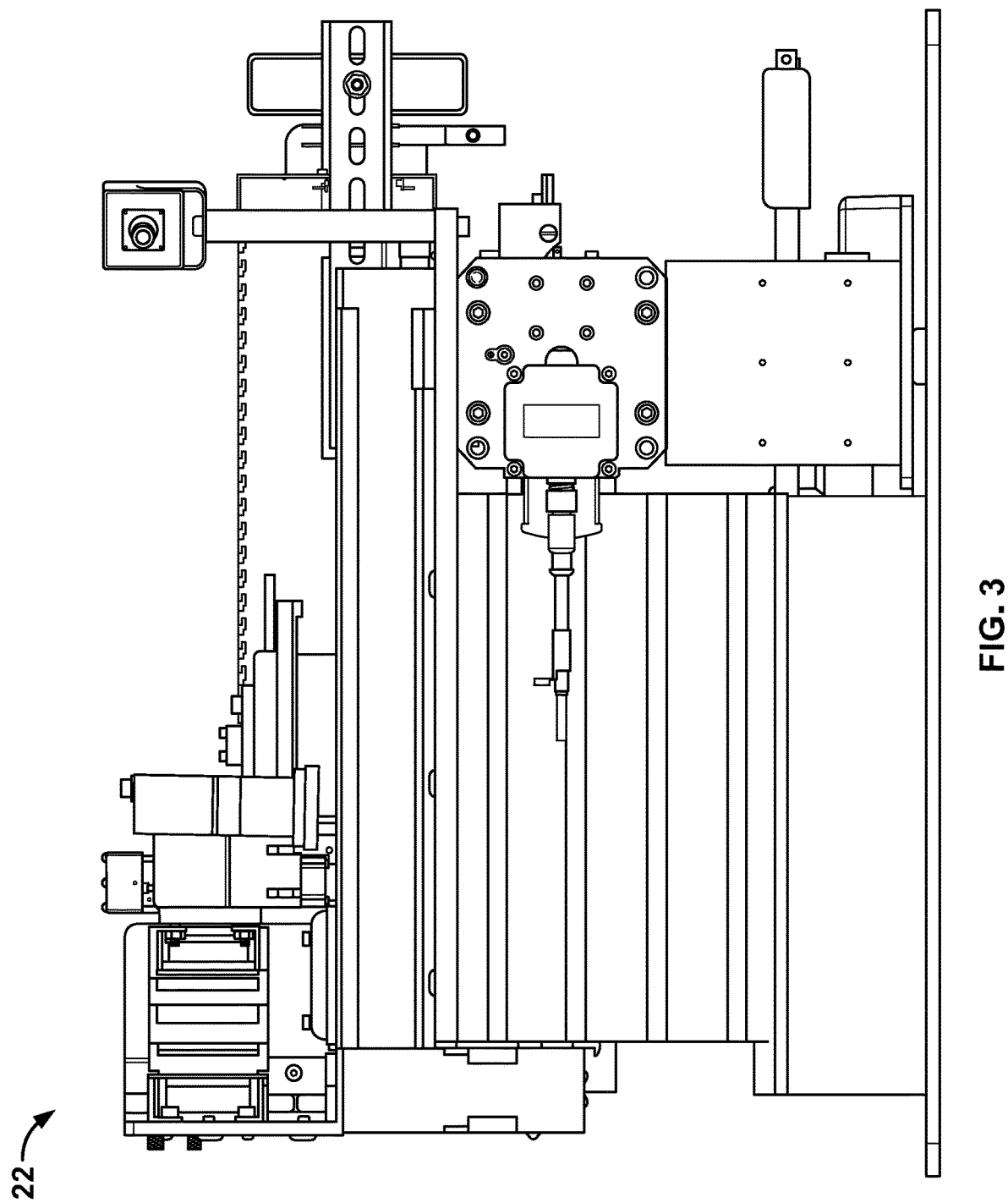
FIG. 3 is a side view of the robot in FIG. 2, in accordance with some embodiments of the present disclosure.
Figure 4:
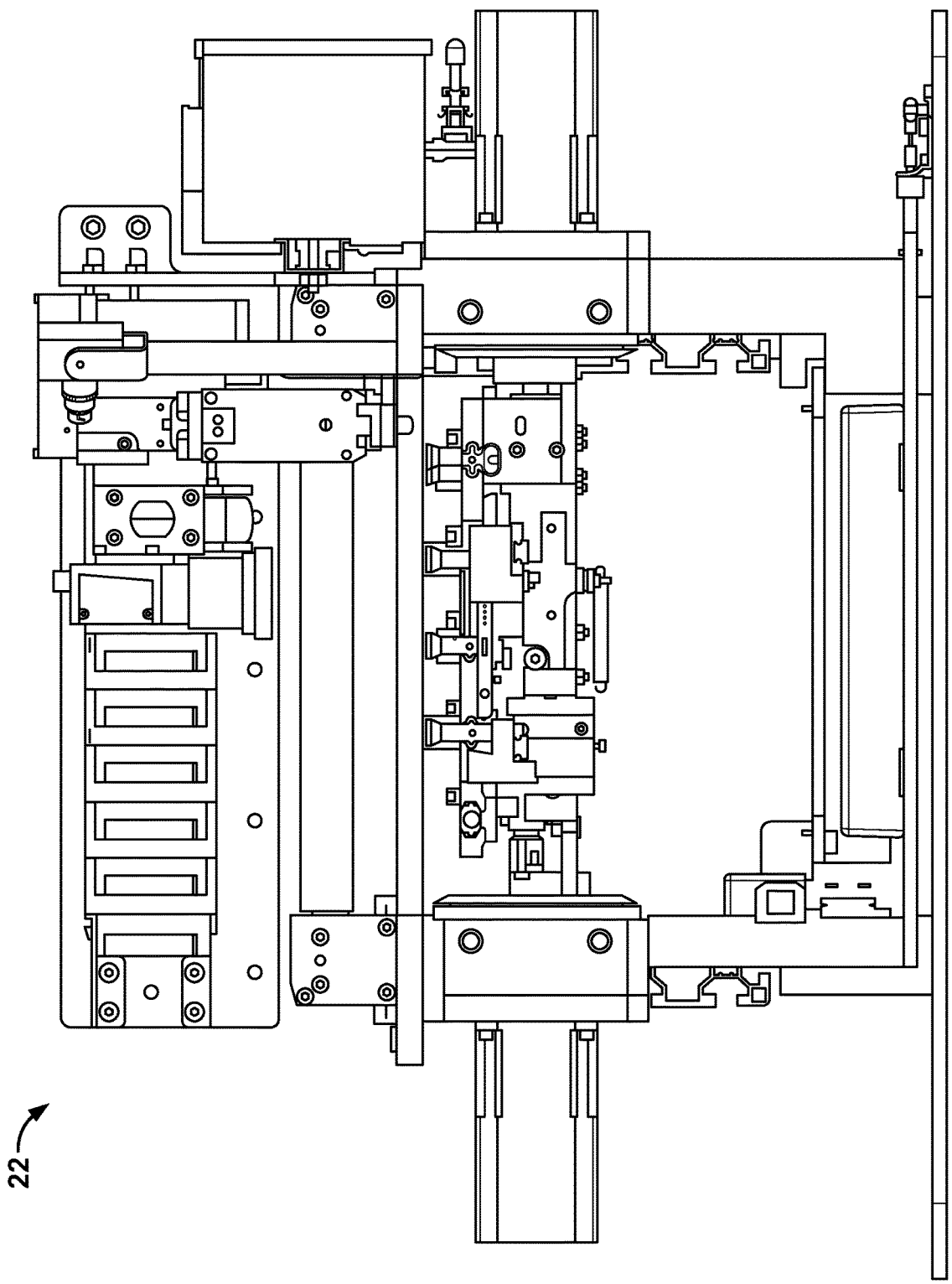
FIG. 4 is a front view of the robot in FIG. 2, in accordance with some embodiments of the present disclosure.
Figure 5:
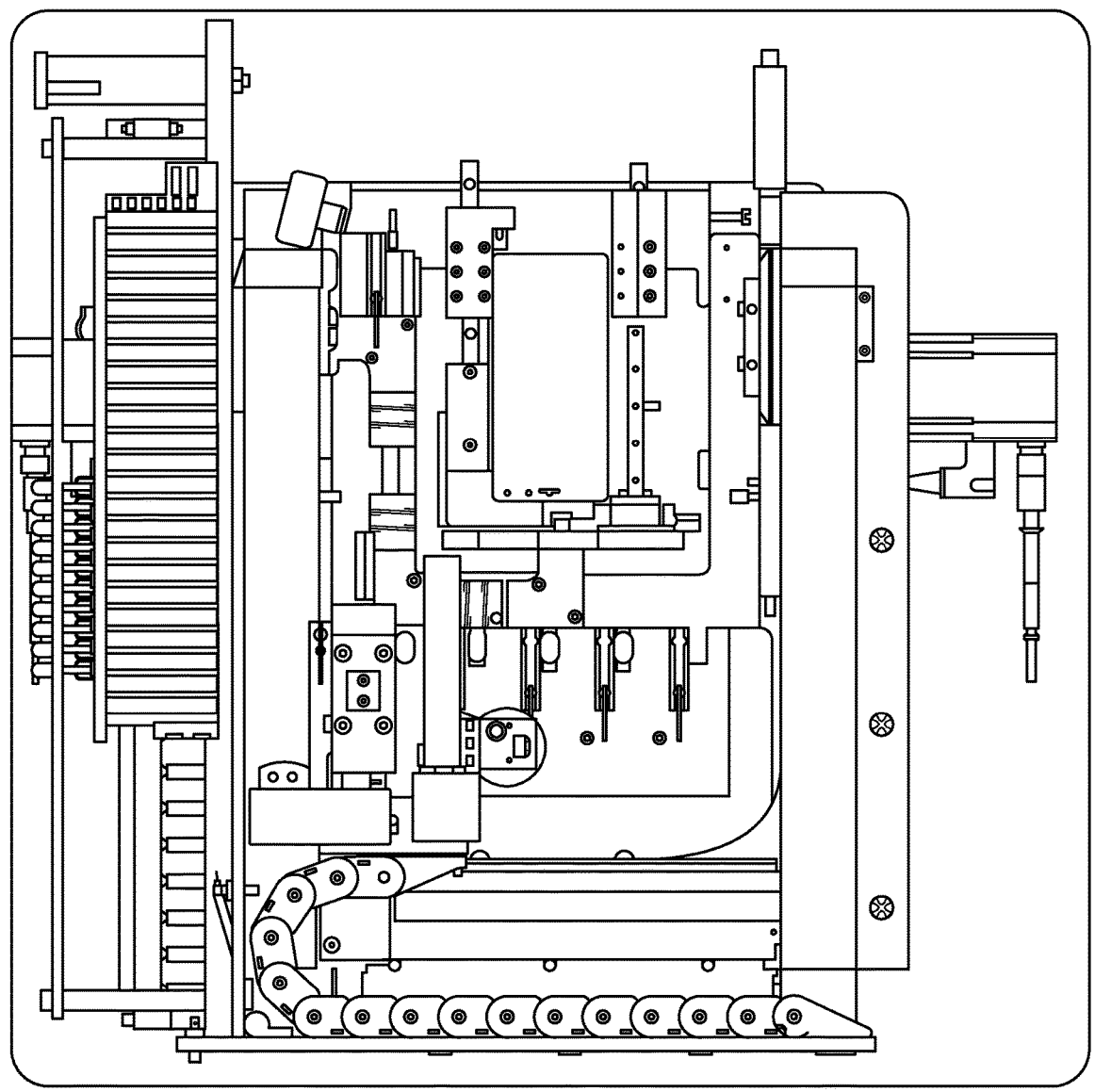
FIG. 5 is a top view of the robot in FIG. 2, in accordance with some embodiments of the present disclosure.

In accordance with various embodiments of the present disclosure, FIG. 3 shows a side view of the robot in FIG. 2; FIG. 4 shows a front view of the robot in FIG. 2; and FIG. 5 shows a top view of the robot in FIG. 2.

Referring back to FIG. 1, each test equipment cabinet 30 may have a door 36, shown in FIG. 1, and includes one or more test computers. In one embodiment, each individual test equipment cabinet 30 houses the test computers that correspond to two device test chambers 16.

In one embodiment, a test application is pre-installed on the mobile device before it is placed on the robot platform for testing. The test application can communicate device information such as model ID back to the test computer which determines the test suite to be executed for that particular make and model. The test application may have cross platform support for iOS and Android OS, or other operating systems.

Each test computer comprises test software and drives the test functionality through the test application. The test software communicates with the test application and triggers various test activities and notifies the robot to perform specific tasks as required by each test. This also includes a library of test parameters that drive the testing for multitude of mobile device models. According to various embodiments, different test algorithms are used for testing different features of different mobile devices.

In one embodiment, the mobile device testing apparatus 10 comprises a master computer. The master computer is a central computer that controls and communicates to each test computer in the multi-unit system. The master computer has a GUI running thereon. The GUI may display list and status of tests being performed. At the end of a test cycle, the master computer will pull all the results and parametric test data from the test computers and display them for the user. In one embodiment, the user monitor 60 may serve as a master computer.

In one embodiment, the robot is controlled through a compact and robust control system driven by programmable logic controller (PLC) and a fieldbus that includes drives and input-output modules mounted directly on the robot frame and communicates with PLC over a network. The PLC holds the robot configurations and motion program as well as a library that includes position mappings for variety of mobile device models and communicates with a test computer through a wireless connection, e.g. a local-area network (LAN) connection.

Through all the features and subsystem described above, a test procedure can be made completely automated and parametric. In one embodiment, a testing procedure includes the following operations. First, an operator places a mobile device in a universal fixture and connects the mobile device to a chamber specific Wi-Fi. Once connected, the operator opens the pre-installed test application and selects the chamber number or ID. Then, the system recognizes the mobile device and initiates the test cycle.

The system first pulls all the information about the mobile device and selects appropriate test suite. The system indicates the PLC to load the corresponding library file for motion.

The robot will then pick up a capacitive touch tip tool and make touchpoints on the screen of the mobile device. It will return the tool at the end of testing sequence or procedure and also simulate multi finger action using the capacitive mesh tips. Simultaneously, the test software can check for various sensors inside the mobile device in the background.

The robot then moves the camera mounted on it to a location where it takes pictures of the mobile device in different test cases used for LCD screen tests such as detecting dead pixels.

The platform then slightly tilts and eventually rotates 180°. Some markers are brought in workspace for the front camera picture of the mobile device. At the same time, the robot will bring the NFC tag near the mobile device to activate NFC sensor and verify it is working. The mobile device is rotated back to its original orientation and a picture is taken from the back camera of the mobile device and is tested for sensor focus and color fidelity.

The robot then picks up the tool with audio connectors and plugs it in the audio port of the phone. In one example, this can be a 3.5 mm analog audio jack, a lighting connector for newer iPhones or a type C connection. The decision is made based on a mapping file in the library. Audio testing is performed to detect any crackling, harmonic distortions and other related parameters.

In one embodiment, all the signal generation and audio samples during the audio testing are being recorded through high precision modules for various time and frequency domain calculations (e.g. a fast Fourier transform analysis) to be performed. The robot is able to move the microphone to a desired location to collect audio samples from different speakers on the device. The sampling of data and analysis takes place in real time and results of the analysis are parametric.

The robot then picks up a magnetic tool to check the Hall sensor. It will also push each of the physical buttons on the mobile device, e.g. volume, lock, mute switch etc. While the robot is interactive with various physical features of the mobile device, several test processes may happen in the background to test internals of the mobile device such as sensors, battery etc.

Figure 6:
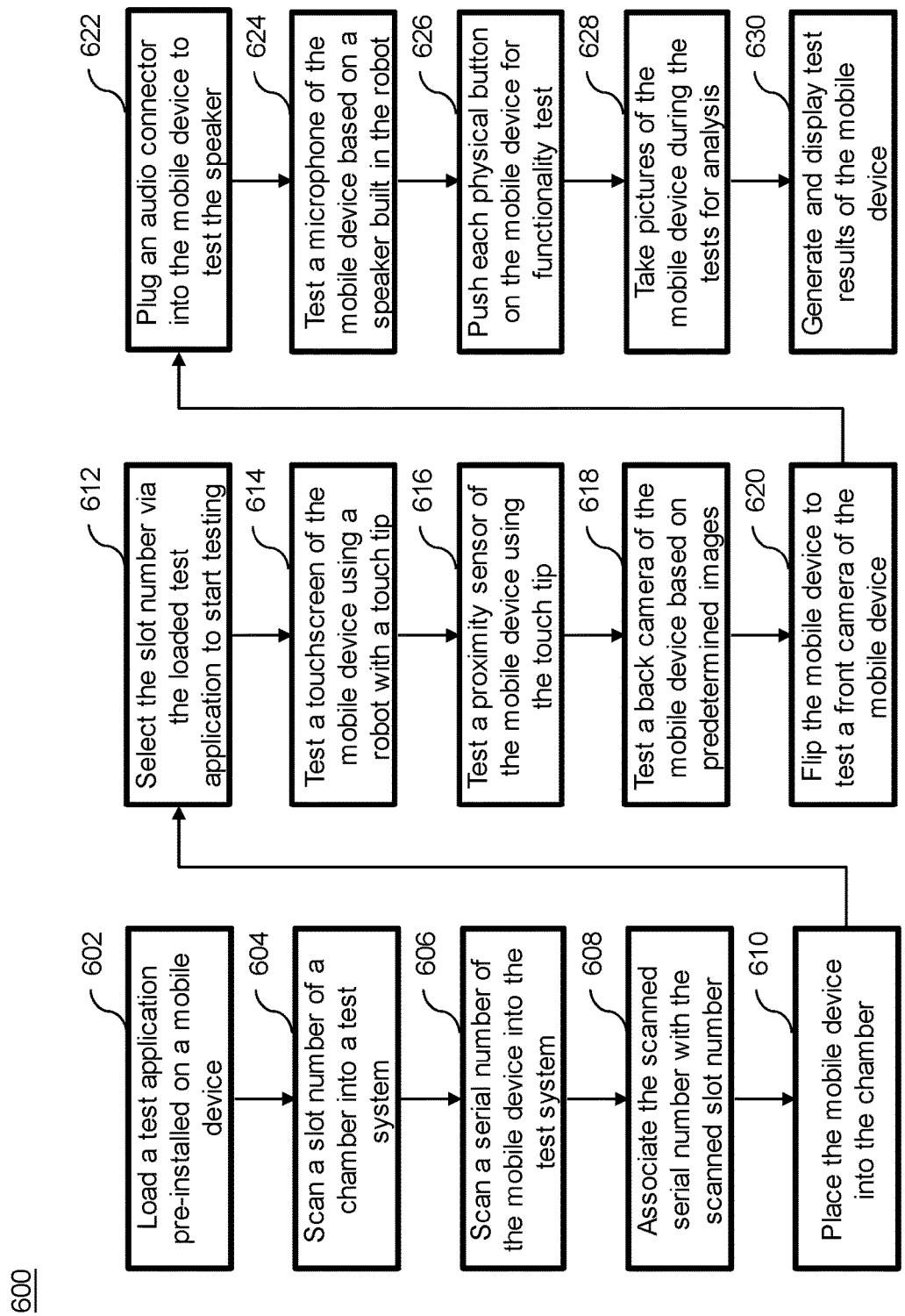
FIG. 6 is a flow chart showing an exemplary method for automatically testing a mobile device, in accordance with some embodiments of the present disclosure.

FIG. 6 shows a flow chart of an exemplary method 600 for automatically testing a mobile device, in accordance with some embodiments of the present disclosure. At operation 602, a test application pre-installed on a mobile device is loaded. At operation 604, a slot number of a chamber is scanned into a test system. At operation 606, a serial number of the mobile device is scanned into the test system. At operation 608, the scanned serial number is automatically associated with the scanned slot number. At operation 610, the mobile device is placed into the chamber.

At operation 612, the slot number is selected via the loaded test application on the mobile device to start testing. At operation 614, a touchscreen of the mobile device is tested using a robot with a touch tip. At operation 616, a proximity sensor of the mobile device is tested using the touch tip. At operation 618, a back camera of the mobile device is tested based on predetermined images. At operation 620, the mobile device is flipped to test a front camera of the mobile device.

At operation 622, an audio connector is plugged into an audio port of the mobile device to test the speaker of the mobile device. At operation 624, a microphone of the mobile device is tested based on a speaker built in or coupled to the robot. At operation 626, each physical button on the mobile device is pushed by the robot for functionality test. At operation 628, pictures of the mobile device are taken during the tests for analysis. At operation 630, test results of the mobile device are generated and displayed, e.g. on a user monitor.

In one embodiment, operations 614 to 630 described above are performed automatically without any human intervention. The order of the operations shown in FIG. 6 may be changed according to different embodiments of the disclosure.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, app, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network or as an app on a mobile device such as a tablet, Phablet, PDA, smartphone, or wearable technology The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer or mobile device, smartphone or tablet. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a mobile smartphone, a personal digital assistant (PDA), tablet, a mobile audio or video player, a game console, a Global Positioning System (GPS) receiver, to name just a few.

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) monitor or other monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Although examples are illustrated and described herein, embodiments are nevertheless not limited to the details shown, since various modifications and structural changes may be made therein by those of ordinary skill within the scope and range of equivalents of the claims.

What is claimed is:

1. An apparatus for automatically testing a mobile device, comprising:
    a robot having a retention device into which the mobile device to be tested is positioned;
    a test computer having a processor and a non-transitory computer readable storage medium storing test software for testing the mobile device, wherein the mobile device is wirelessly connected to the test computer and has a single test application installed thereon and, in cooperation with the test software, is used to perform all of a plurality of tests such that at least one of the plurality of tests is being performed at the same time as another of the plurality of tests is being performed, wherein the robot is configured for performing interaction and manipulation of the mobile device in cooperation with the test application and the test software during the testing;
    a scanner configured to scan a serial number of the mobile device and a slot number of a test chamber, and automatically start the testing of the mobile device after scanning the serial number and the slot number; and
    a user monitor electrically connected to the test computer and configured for providing a result of the testing of the mobile device.

2. The apparatus of claim 1, wherein:
    the robot is a 7-axis robotic system having a robot arm; and
    the robot arm has 4 degrees of freedom in the three-dimensional space.

3. The apparatus of claim 1, wherein the interaction and manipulation of the mobile device performed by the robot comprise at least one of:
    using a capacitive touch tip tool to make touchpoints on a screen of the mobile device;
    moving a camera coupled on the robot to a location for the camera to take pictures of the screen of the mobile device when the screen is turned to different colors by the test application;
    moving a tag near the mobile device to activate a sensor of the mobile device;
    plugging an audio connector into an audio port of the mobile device;
    picking up a magnetic tool to check a sensor of the mobile device; or
    pushing each physical button on the mobile device for functionality test.

4. The apparatus of claim 1, wherein:
    the interaction and manipulation of the mobile device is performed by the robot while at least one test process is performed to test internal components and/or feature performances of the mobile device; and
    the mobile device is at least one of: a smartphone, a smart watch, or a tablet.

5. The apparatus of claim 1, further comprising:
    a position calibration tool coupled to the robot and configured for determining positions of interfaces and physical buttons of the mobile device, based on positions of points on the retention device and a calibration software.

6. A method for automatically testing a mobile device, comprising:
    loading a single test application on the mobile device positioned onto a retention device of a robot;
    automatically wirelessly connecting the mobile device to a test computer having a processor and a non-transitory computer readable storage medium storing test software for testing the mobile device;
    automatically starting the testing of the mobile device after scanning a serial number of the mobile device and a slot number of a device test chamber;
    automatically manipulating the mobile device using the robot configured for interacting with the mobile device in cooperation with the test application and the test software;
    automatically performing all of a plurality of tests of the mobile device based on the test application such that at least one of the plurality of tests is being performed at the same time as another of the plurality of tests is being performed; and
    automatically sending a result of the testing of the mobile device to a user monitor electrically connected to the test computer and configured for displaying the result of the testing of the mobile device.

7. The method of claim 6, wherein the automatically starting the testing of the mobile device comprises:
    scanning, using a scanner, the slot number of the device test chamber housing the robot;
    scanning, using the scanner, the serial number of the mobile device; and
    associating the scanned serial number with the scanned slot number before the testing.

8. The method of claim 7, further comprising:
    automatically determining testing-related information of the mobile device based on the serial number of the mobile device, wherein the testing-related information comprises information about at least one of
    an operation system of the mobile device,
    locations of interfaces of the mobile device,
    locations of cameras of the mobile device, locations of physical buttons of the mobile device, or features of the mobile device.

9. The method of claim 7, further comprising:
positioning the mobile device onto the retention device of the robot;
selecting the slot number via the test application to start testing; and
automatically releasing a magnetic lock on a door of the device test chamber after the testing is completed.

10. The method of claim 7, further comprising:
automatically monitoring, by a camera that is located in the device test chamber and connected to a sanity monitor outside the device test chamber, a process of the automatically testing.

11. The method of claim 6, wherein the automatically testing comprises:
automatically testing, based on the test application, a touchscreen of the mobile device using a capacitive touch tip tool coupled to the robot; and
automatically testing, based on the test application, a proximity sensor of the mobile device using the capacitive touch tip tool.

12. The method of claim 6, wherein the automatically testing comprises:
automatically testing, based on the test application, a back camera of the mobile device by based on predetermined images;
automatically turning over the mobile device by rotating the retention device; and
automatically testing, based on the test application, a front camera of the mobile device based on the predetermined images.

13. The method of claim 12, wherein the predetermined images comprise:
a colorful patterned image and a white blank image.

14. The method of claim 6, wherein the automatically testing comprises:
automatically plugging an audio connector coupled to the robot into an audio port of the mobile device; and
automatically testing, based on the test application, a speaker of the mobile device via the audio connector.

15. The method of claim 6, wherein the automatically testing comprises:
automatically generating a sound by a speaker coupled to the robot; and
automatically testing, based on the test application, a microphone of the mobile device using the sound.

16. The method of claim 6, wherein the automatically testing comprises:
automatically pushing, using a mechanical finger coupled to the robot based on the test application, each physical button on the mobile device for functionality test;
automatically taking, by a camera coupled to the robot, pictures of a screen of the mobile device when the screen is turned to different colors based on the test application; and
automatically analyzing the pictures while other tests are being performed on the mobile device.

17. A system for automatically testing mobile devices, comprising:
a plurality of robots each of which having a retention device configured for holding one of a plurality of mobile devices to be tested;
a plurality of device test chambers each housing a respective one of the plurality of robots;
a plurality of test computers each of which corresponds to one of the plurality of robots, and has a processor and a non-transitory computer readable storage medium storing test software for testing a corresponding one of the plurality of mobile devices, wherein the corresponding mobile device is wirelessly connected to the test computer and has a single test application installed thereon and, in cooperation with the test software, is used to perform all of a plurality of tests such that at least one of the plurality of tests is being performed at the same time as another of the plurality of tests is being performed, wherein each of the plurality of robots is configured for performing interaction and manipulation of the corresponding mobile device held by the retention device in cooperation with the test application and the test software during the testing; and
a scanner electrically connected to the plurality of test computers and configured to, for each of the plurality of device test chambers, scanning a slot number of the corresponding device test chamber, scanning a serial number of the corresponding mobile device to be tested in the corresponding device test chamber, wherein the testing of the corresponding mobile device automatically starts after scanning the slot number and the serial number.

18. The system of claim 17, wherein the scanner is further configured to associate the scanned serial number with the scanned slot number before automatically starting the testing.

19. The system of claim 17, further comprising:
a user monitor electrically connected to the plurality of test computers and configured for providing test results of the plurality of mobile devices; and
a sanity monitor configured for displaying internal views of the plurality of device test chambers.

20. The system of claim 17, further comprising:
a plurality of radio frequency (RF) shielded cabinets each containing a respective one of the plurality of device test chambers therein;
a wireless router electrically connected to the plurality of test computers by wire; and
at least one antenna coupled to and through a wall of each RF shielded cabinet to connect the wireless router with the corresponding mobile device to be tested in the RF shielded cabinet.

21. The apparatus of claim 1, further comprising a radio frequency shielded cabinet containing the test chamber.

* * * * *